United States Patent [19]

Le Baron

[11] 3,736,383

[45] May 29, 1973

[54] MULTICUSTOMER CENTRALIZED CALL DIVERTER

[75] Inventor: Theodore Le Baron, Oak Park, Ill.

[73] Assignee: American Telephone and Telegraph Company, New York, N.Y.

[22] Filed: Oct. 28, 1971

[21] Appl. No.: 193,448

[52] U.S. Cl.........179/18 HA, 179/7 MM, 179/18 DA

[51] Int. Cl.................................................H04m 3/38

[58] Field of Search ....................179/18 DA, 18 HA, 179/27 CB, 7 MM, 18 AD, 18 B, 18 BF

[56] References Cited

UNITED STATES PATENTS

| | | | |
|---|---|---|---|
| 3,331,926 | 7/1967 | Largey | 179/18 DA |
| 3,546,393 | 12/1970 | Joel, Jr. | 179/18 B |
| 3,668,317 | 6/1972 | Vitalo | 179/18 BF |
| 3,591,723 | 7/1971 | Dal Monte | 179/7 MM |

*Primary Examiner*—Thomas W. Brown
*Attorney*— N. S. Ewing and James W. Falk

[57] ABSTRACT

A central office located call diverter for permitting a multitude of PBX (Private Branch Exchange) customers to restrict outgoing calls on PBX trunks. A diverter register registers the first three digits dialed over a diverter trunk on each outgoing call and a common memory control unit compares them with a customer selected and changeable repertory of allowed three-digit codes stored in a common memory. In response to the code comparison, the outgoing call is either terminated or allowed to be completed and all diverter equipment associated with the call is released to service another outgoing call.

9 Claims, 9 Drawing Figures

MULTICUSTOMER CENTRALIZED CALL DIVERTER

BACKGROUND OF THE INVENTION

This invention relates to automatic call diverter equipment located in a telephone switching office and shared by a plurality of PBX customers for call diverter service.

Private Branch Exchanges (PBXs) are generally connected to neighboring central offices via trunks for permitting the placement of calls outside of the PBXs as may be required in the normal course of business. The completion of such calls is usually effected by automatic switching equipment which allows completion of calls to anywhere within the United States without operator assistance. In many instances, however, it is proven to be economical for PBX customers to restrict the automatic completion of certain toll calls to a group of office codes and to complete other toll calls only with the assistance of an operator. A common method of restricting such calls is to provide call diverter equipment which monitors all calls directed outside of a PBX. The diverters typically register the first three digits dialed on an outgoing call and compare them with a customer selected file of three-digit directory codes to determine if the call should be completed without operator intervention. If it is determined that operator assistance is not needed the diverted disassociates itself from the call and allows the call to be completed. On the other hand, if it is determined that the registered digits are not included in the list of allowed codes, the diverter routes the call to an operator and then disassociates itself from the call in order to service other PBX outgoing calls.

Among the problems in the prior art is that each PBX is required to have individual call diverter equipment, which according to the present state of the art is usually located at the customer premises. Changing a list of allowed directory codes in such equipment generally requires adding and removing a number of cross connections. As a result, changing the list of allowed directory codes, as well as normal maintenance, requires dispatching a technician to a customer premises. This generally requires an appreciable part of a technician's normal working day and requires taking a call diverter out of service for a period of time, usually during business hours when it is needed most. To ease the maintenance problem, some prior art call diverters are located in the central office. Such arrangements, however, have proven to create space problems in urban central offices which are usually short of equipment space when the diverter service is requested. These offices often serve a large number of PBX customers who must be furnished with individual call diverter equipment. The necessity for individual customer equipment obviously aggravates the space problem and sometimes proves inefficient because each diverter is generally idle much more than it is in use.

Thus, prior art call diverters create a maintenance problem when located on the PBX customer premises as well as space and efficiency problems when lcoated in urban central offices. Accordingly, a need exists for call diverter arrangements which minimize the foregoing problems and the amount of equipment needed for each PBX customer while allowing directory codes to be quickly and easily changed with minimal outage time of diverter eqiupment.

SUMMARY OF THE INVENTION

The foregoing needs of the call diverter art are satisfied by an illustrative embodiment of my invention wherein I provide a central office located call diverter utilizing common equipment to serve a multitude of PBX customers served by the office. My call diverter has a common group of registers; an idle one of which is associated with each PBX outgoing call to provide call diverter service. If one of the common group of registers should require maintenance, the register may be serviced without taking the call diverter out of service, as the remaining diverter registers share the call diverter service load. A common memory is provided wherein each PBX customer is assigned space to store area and office codes designating allowed calls. The use of a common memory in my central office located call diverter advantageously permits the use of a relatively small but large capacity memory which may quickly and easily have its contents changed by erasing and/or writing in the memory with an external circuit. As a result my call diverter eliminates the necessity of terminating call diverter service to a customer during normal working hours to accomplish a change in a customer list of allowed directory codes.

Each PBX is connected to the central office by at least one trunk which is terminated in a diverter trunk circuit having a trunk identification code identifying the memory space assigned to the PBX. Whenever an outgoing call is placed over a PBX trunk, the associated diverter trunk circuit bids for and is connected to an idle one of the diverter registers to which the trunk identification code is forwarded. It is a feature of my invention that an idle diverter register is connected to a diverter trunk circuit before the diverter trunk is connected to a central office register and dial tone is returned, to guarantee that call diverter service is provided. The diverter register connected to the diverter trunk circuit stores the dialed area or office code simultaneously with its registration by the central office register. It is another feature of my invention that single-digit codes such as "0" are checked by the register to determine if the call should be completed. When a three-digit code is registered, the diverter register bids against other busy diverter registers for access to a memory control circuit which checks the codes stored in the memory. By utilizing one common memory control circuit, which is able to check the outgoing calls from a number of PBXs, the necessity of providing a control circuit on a one-to-a-customer basis, as is done in the prior art, is eliminated. Upon being seized, the memory control circuit uses the trunk identity code of the associated diverter trunk circuit to find the proper memory space and compares the registered digits with the codes stored in the memory to determine if the digits represent an allowed call. It is still another feature of my invention that the memory control circuit returns signals to the diverter trunk circuit that positively indicate whether the call is allowed or not. If the call is allowed, the signal returned to the diverter trunk circuit causes the memory, memory control circuit, and diverter register to be released to provide diverter service to other PBX trunks and the call is allowed to be completed. If the call is not allowed, the signal returned to the diverter trunk circuit again causes all call diverter circuitry to be released for further use, but also causes the trunk circuit to disconnect the trunk line from the central office equipment and to reconnect the line to a recorded announcement instructing the caller to dial the PBX operator in order to complete the call.

BRIEF DESCRIPTION OF THE DRAWING

The foregoing and other features of my invention will become more apparent upon consideration of the following description in conjunction with the drawing, in which:

FIGS. 4 through 6 and 8 are schematic diagrams of a memory control circuit wherein:

FIG. 4 is a schematic block diagram of a register connector, 2/5 code check circuit, decimal translator, and odd tens check circuit;

FIG. 5 is a schematic diagram of a hundreds- and tens-digit translator;

FIG. 6 is a schematic diagram of an address register and a memory input circuit;

FIG. 8 is a schematic diagram of a memory output circuit and an output register.

In FIGS. 1 to 8 the equipment has been given alphabetic or numeric designations which are prefixed by a single digit indicating the figure in which the eqiupment is located. Thus, for example, register 312 is located in FIG. 3.

My invention may advantageously function with a common control switching system such as the one disclosed in U.S. Pat. No. 2,585,904, issued Feb. 19, 1952 to A. J. Busch. It should be understood that my invention is not limited to use with a switching system of this type but may be used with any switching system.

The memory used in this specific embodiment of my invention may advantageously be the nondestructive readout "piggyback twistor" memory described in detail in the Bell System Technical Journal, "Stored Program Control No. 1A Store," W. A. Baker et al. Vol. 49, No. 10, pages 2,509–2,560.

GENERAL DESCRIPTION

Figure 1:
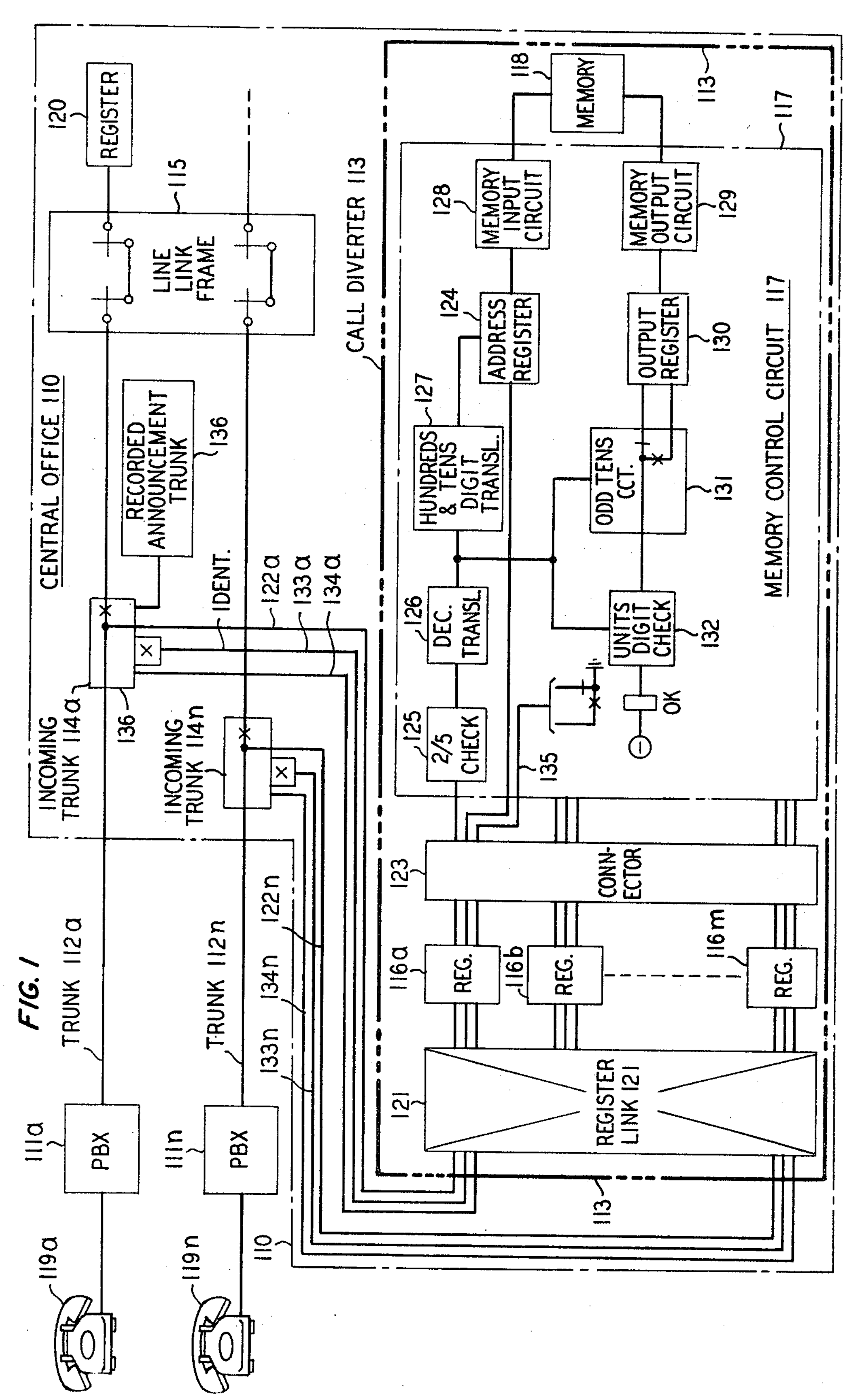
FIG. 1 is a block diagram showing the interrelationship of the various components of one embodiment of my invention and its manner of connection at a central office to provide call diverter service to PBXs.

Referring now to FIG. 1, central office 110 services outgoing calls from PBXs **111*a*–111*n* over trunks 112*a*–112*n*. Diverter trunk circuits 114*a*–114*n* in central office 110 respectively, connect trunks 112*a*–112*n* to line link frame 115 of office 110. According to my invention, office 110 contains call diverter 113 which determines whether outgoing calls from PBXs 111*a*–111*n* are to be completed without PBX operator intervention. Trunk circuits 114*a*–114*n* connect trunks 112*a*–112*n* to diverter 113 over leads 122*a*–122*n*, connect trunk identity code leads 133*a*–133*n* to diverter 113, and receive the output from diverter 113 over leads 134*a*–134*n*. It should be noted that trunk circuits 114*a*–114*n* are the only telephone equipment in central office 110 to which diverter 113** is connected.

Diverter 113 includes a group of diverter registers **116*a*–116*m* ($m<n$), a memory control circuit 117, and a memory 118. Registers 116*a*–116*m* are each equipped to receive either dial pulse or TOUCH-TONE signaling as individual ones of PBXs 111*a*–111*n* may be equipped for either type of signaling. As individual ones of trunks 114*a*–114*n* become busy they are connected to idle ones of registers 116*a*–116*m* by register link 121. Upon registration of three digits, busy ones of registers 116*a*–116*m* bid against each other for connection to memory control 117 by connector 123. Memory 118 has memory space assigned to each of PBXs 111*a*–111*n* in which is stored customer selected three-digit codes representing allowed calls. However, single memory spaces containing one or more message unit office codes may be shared by particular ones of PBXs 111*a*–111*n*. Memory control 117 utilizes the trunk identity code to compare the appropriate list of stored codes with the codes registered in busy ones of registers 116*a*–116*m* to determine whether outgoing calls being placed over trunks 112*a*–112*n* are allowed. Memory control 117 then returns a signal over leads 135 and one of leads 134*a*–134*n* to a particular one of trunk circuits 114*a*–114*n* indicating the call is either allowed or not allowed. In response to the signal from memory control 117, the particular one of trunks 114*a*–114*n* either allows the call to be completed or terminates the call. Following the return of the signal all call diverter 113 equipment associated with the call on the particular one of trunks 114*a*–114*n*** is released for use with another outgoing call.

To better illustrate the function of call diverter 113 the placement of an outgoing call is briefly described. A caller takes telephone set **119*a* off-hook and dials the digit "9." Set 119*a* is connected to trunk 112*a* by PBX 111*a* and a request for service is sent to trunk circuit 114*a*. Trunk circuit 112*a* normally connects set 119*a* through to line link frame 115 immediately but trunk circuit 114*a* is arranged to withhold the request for service from line link 115 until diverter 113 is connected to service the call. This is done to guarantee that all outgoing calls from PBXs 111*a* through 111*n* are checked by diverter 113. To accomplish this a request for call diverter service is sent to diverter 113 by trunk circuit 114*a* when it is initially seized. Idle diverter register 116*a* is connected to trunk circuit 114*a* by register link 121 and then register 116*a* returns a start signal to circuit 114*a*. In response to the start signal, circuit 114*a* connects trunk 112*a* through to line link 115 which in turn connects idle register 120 to trunk 112*a* and returns dial tone to set 119*a*** in a manner well known in the telephone art.

Link 121 also connects trunk identity code leads **133*a* to register 116*a* to be used to identify the portion of memory 118 assigned to PBX 111*a*. As digits are dialed at set 119*a*, the digits are registered by both register 120 and register 116*a*. As soon as the area or office code digits have been registered by register 116*a*, register 116*a* generates a signal causing connector 123 to connect register 116*a* to idle memory control 117. The digits stored in register 116*a* in a standard 2-out-of-5 (2/5) code and the trunk identity code are then forwarded to memory control 117. The trunk identity code is stored in address register 124 and the three digits are checked by 2/5 check circuit 125 to prevent further use of memory control 117 if nonvalid coded digits are received. In preparation of interrogation of memory 118, the 2/5 encoded digits are first translated to decimal form by decimal translator 126. The decimal encoded hundreds and tens digits are then translated by translator 127 to specify, illustratively, a group of eighty bits in memory 118 that includes a bit which represents the registered code. The translated information is stored in address register 124. Memory input circuit 128 utilizes the translated hundreds and tens digits and part of the trunk identity code stored in register 124 to read out the desired eighty bits stored in memory 118. Memory output circuit 129 utilizes the remainder of the trunk identity code to select the 20 of the 80 bits containing the desired bit and stores them in output register 130. These 20 bits contain an even and an odd tens group with one of the two groups of ten digits corresponding to the dialed tens digit. The ten bits among which is the desired bit is selected by odd tens circuit 131. To accomplish this the tens-digit output of translator 126 is used to operate a relay in odd tens circuit 131 only if the tens digit of the dialed code is odd. In this manner the desired ten bits are passed through transfer contacts of the relay in odd tens circuit 131 to unit digit check circuit 132. Finally, unit digit check circuit 132 compares the unit digit output of translator 126 with the appropriate one of the ten bits selected by odd tens circuit 131. If the memory bit corresponding to the registered code indicates the call is allowed, unit digit check circuit 132 will operate relay OK and an allowed signal is returned over leads 135, through connector 123, register 116*a*, link 121, and lead 134*a* to incoming trunk 114*a*. The allowed signal causes the release of all call diverter 113 circuits associated with the call being placed through trunk 114*a*, and the call is allowed to be completed. If the memory bit corresponding to the registered code indicates the call is not allowed, unit digit check circuit 132 will not operate relay OK and a not-allowed signal is returned over leads 135 to trunk circuit 114*a*. Again all diverter 113 circuits associated with the outgoing call through trunk circuit 114*a* are released for further use. In response to the not-allowed signal, trunk circuit 114*a* opens the connection to line link frame 115 and the connection through line link frame 115 to register 120 is thereby released. In addition trunk circuit 114*a* reconnects trunk 112*a* to recorded announcement trunk 136 which instructs the caller at set 119*a*** to call the PBX operator to complete the call.

DETAILED DESCRIPTION

Figures 2, 9:
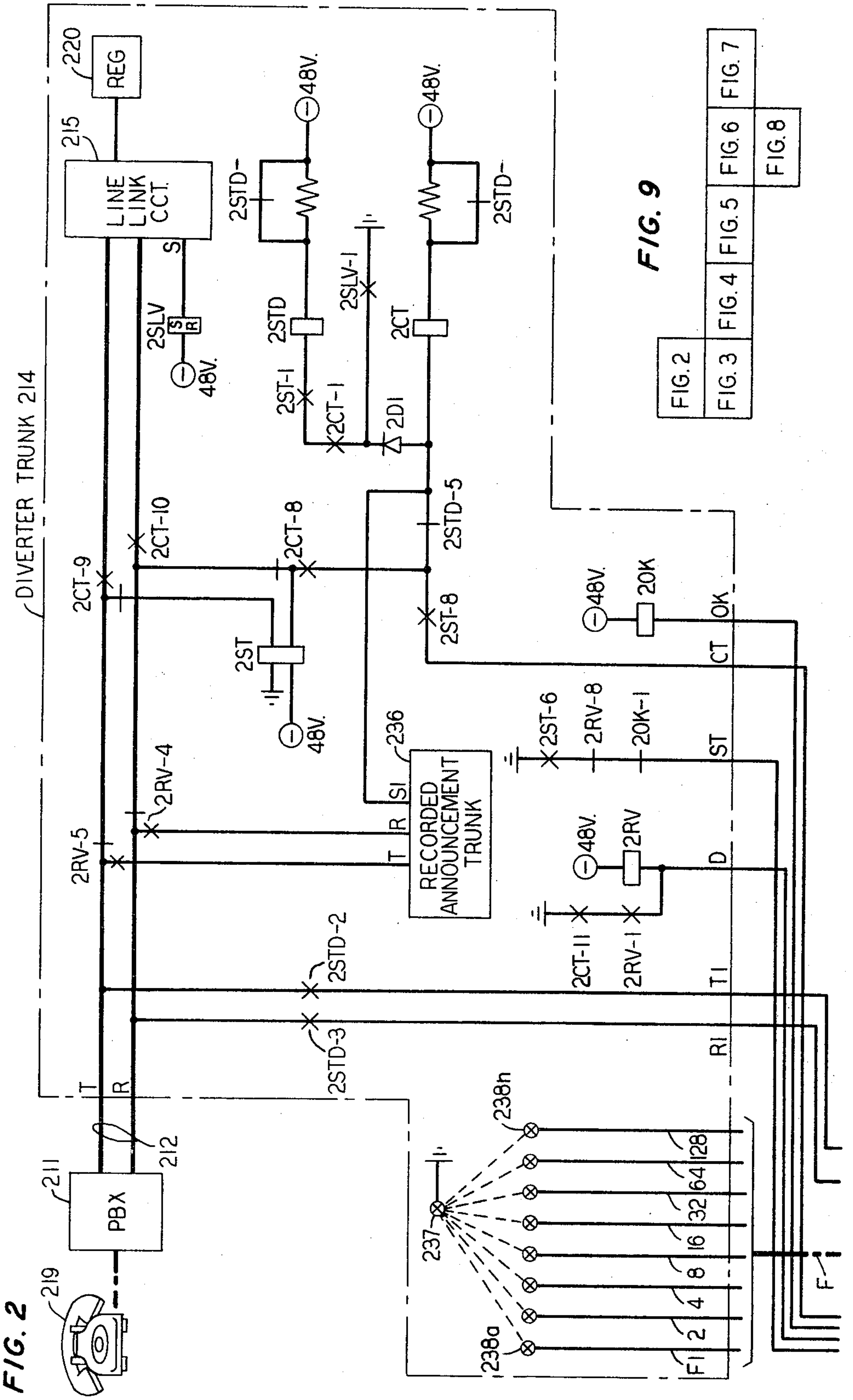
FIG. 2 is a schematic diagram of a central office diverter trunk circuit.
FIG. 9 shows the manner in which the other figures should be arranged to simplify tracing the circuits.
Figure 3:
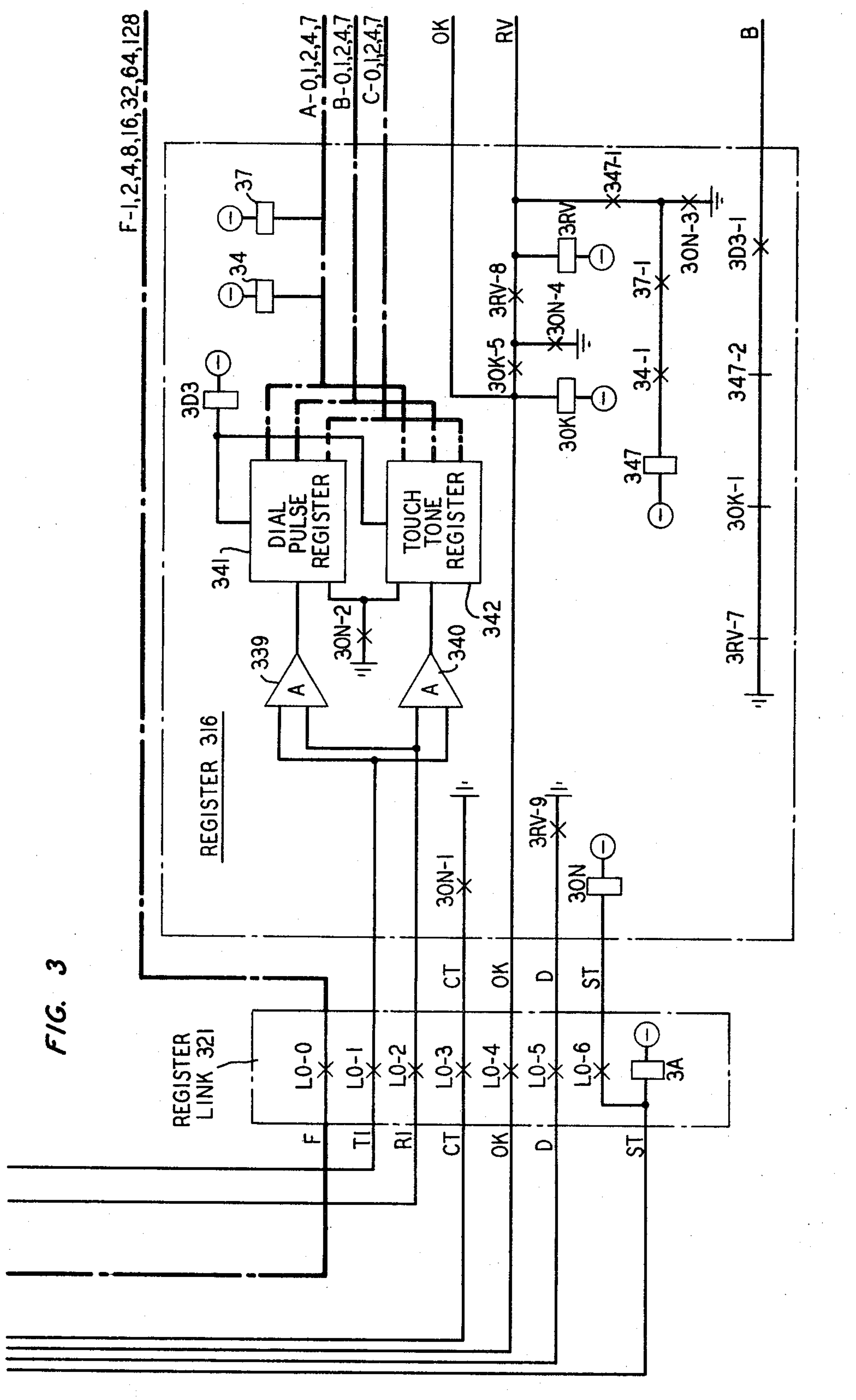
FIG. 3 is a schematic diagram of a call diverter register and a block diagram of a link which connects the diverter registers to the diverter trunk circuits.

Referring now to FIG. 2, only one PBX (211) is shown for simplicity in presentation. Likewise, in FIG. 3 only one diverter register (316) is shown for simplicity in presentation.

Seizing an Outgoing Trunk Line

In the specific embodiment of my invention described herein a party desiring to place an outgoing call from telephone set 219 in FIG. 2 dials the digit "9." In response thereto set 219 is automatically connected to idle trunk 212 and set 219 closes a loop on leads T and R in a manner well known in the telephone art. The loop on leads T and R operates start relay 2ST in diverter trunk circuit 214 over a path through the upper winding of relay 2ST, break contacts 2CT–9 and 2RV–5, the loop on leads T and R, contacts 2RV–4 and 2CT–8, and the lower winding of relay 2ST. The operation of relay 2ST generates a request for call diverter service which operates relay 3A in register link 321 in FIG. 3 via lead ST, break contacts 2OK–1 and 2RV–8, and make contact 2ST–6. In response to the operation of relay 3A, register link 321 selects idle diverter register 316 from a group of idle diverter registers (not shown) in a manner well known in the art and link switch contacts LO–0 through LO–6 are operated to connect register 316 to trunk circuit 214. Relay 3ON in register 316 is operated by the ground potential on lead ST upon the operation of link switch contact LO–6. Relay 3ON, in turn, generates a signal to operate relay 2CT in trunk circuit 214 as an indication that register 316 is ready to register digits. The operate path for relay 2CT is through break contact 2STD–5, make contact 2ST–8, lead CT, link 310, and make contact 3ON–1. The closure of the make contacts of transfer contacts 2CT–9 and 2CT–10 connects leads T and R through to line link 215 which in turn connects central office register 220 and dial tone to the line as described in the Busch patent. In addition, line link 215 returns call supervision ground potential over lead S to operate relay 2SLV in trunk 214. The operation of relay 2CT also completes an operate path for relay 2STD through make contacts 2ST–1 and 2CT–1 and diode 201. Make contacts 2STD–2 and 2STD–3 connect transmission leads T and R to link 321 to be connected to register 316. Ground potential on terminal 237 is cross-connected to terminals **238*a* through 238*h* in a code that identifies the memory space assigned to PBX 211. This trunk identity code is connected to register 316 by link 321 to be used as described in detail further in the specification. In register 316 amplifiers 339 and 340 respectively amplify the dial pulsing or TOUCH-TONE pulsing received from telephone set 219, and the digits are stored in dial pulse register 341 or TOUCH-TONE register 342**.

Calls Requiring Less Than Three Digits

Figure 4:
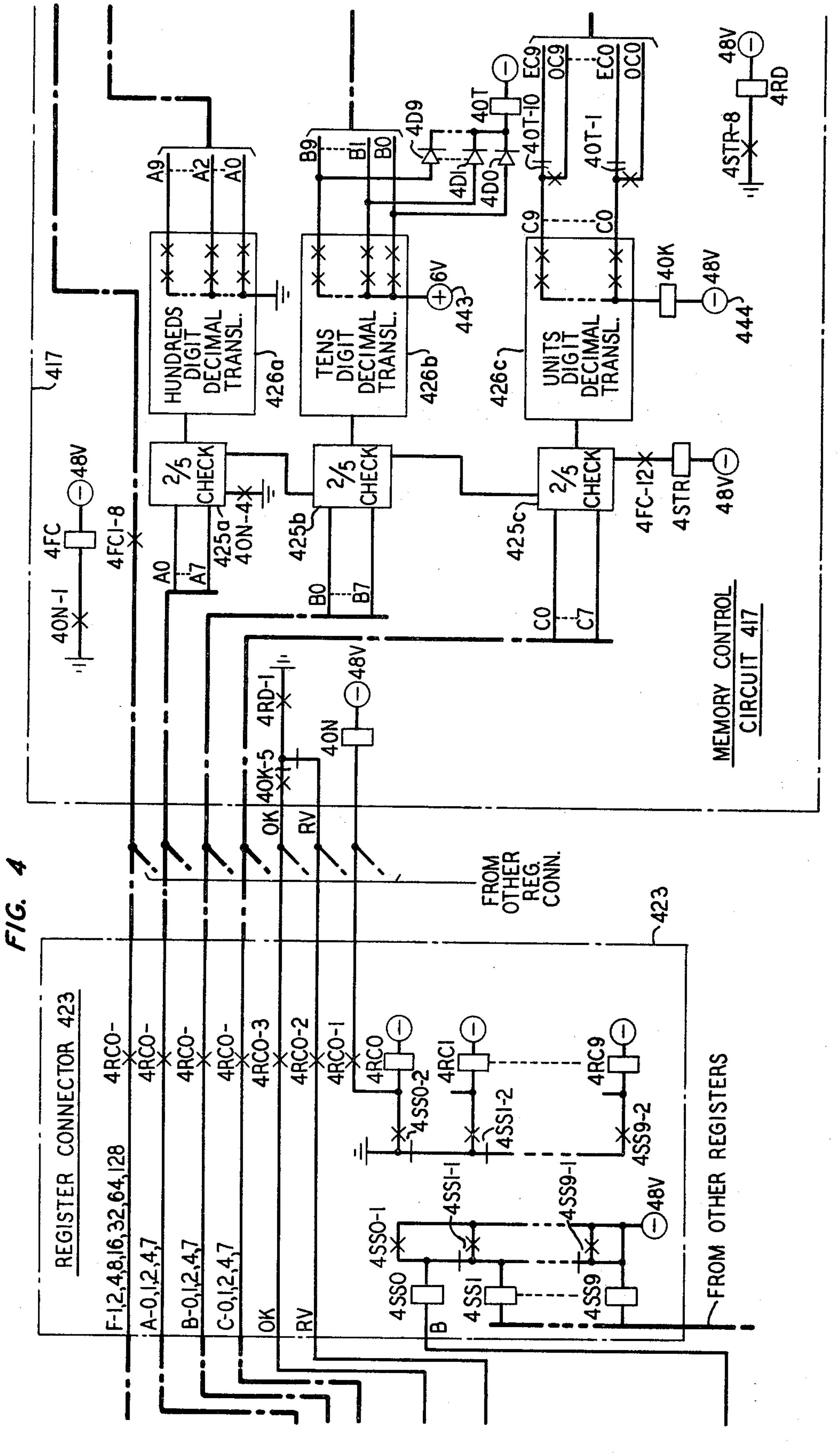

Diverter register 316 registers three digits before memory control circuit 417 in FIG. 4 is seized to check the registered digits as described further in the specification. However, certain emergency and service connections may be completed upon dialing particular single-digit codes. These particular digits are checked in diverter register 316 without utilizing memory control 417. In this specific embodiment of my invention only the one-digit code "0" is checked and blocked, but one skilled in the art will recognize that any one-digit code may be blocked or allowed by register 316 using the technique taught herein.

Assume that the calling party at telephone set 219 has been connected to line link 215 and dials "0" in an attempt to complete a nonallowed call through an operator other than the operator at PBX 211. Upon registration of the digit "0" in register 316, output leads A–4 and A–7 have ground potential thereon in a conventional 2/5 code arrangement and relays 34 and 37, which are respectively connected to these leads, are operated. Upon the operation of relays 34 and 37, relay 347 is operated over a path through make contacts 34–1, 37–1, and 3ON–3. Relay 347 operates relay 3RV as an indication that the call is not allowed over a path through make contacts 347– 1 and 3ON–3. Relay 3RV in turn signals incoming trunk 214 that the call is not allowed by operating relay 2RV therein over a path through lead D, link 321, and make contact 3RV–9. Relay 2RV is locked operated through make contacts 2RV–1 and 2CT–11. The break contacts of transfer contacts 2RV–4 and 2RV–5 open the connection of trunk 212 to line link 215 while the make contacts reconnect trunk 212 to recorded announcement trunk 236. The loop on leads T and R causes announcement trunk 236 to go through its cycle instructing the caller at set 219 to dial the PBX operator. Ground potential is removed from lead ST at break contact 2RV–8, thereby releasing link 310 and diverter register 312 by releasing relays 3A and 3ON. Line link 215 interprets the open connection at break contacts 2RV–4 and 2RV–5 as an abandoned call, releases register 220, and removes ground potential from lead S. Relay 2SLV is thereby released and the holding path of relays 2CT and 2STD is opened at make contact 2SLV–1. Relay 2STD is released by relays 2CT and 2ST are held operated by ground potential on lead S1 from announcement trunk 236. When the party at set 219 goes on-hook, the loop trunk 212 is opened and announcement trunk 236 is released. Announcement trunk 236 then removes the ground potential from lead S1 and relays 2CT and 2ST are released. Thereafter relay 2RV is released as its holding path is opened at make contact 2CT–11. At this time all relays in diverter trunk 214 are unoperated and it is idle.

Seizure of Memory Control Circuit

Figure 6:
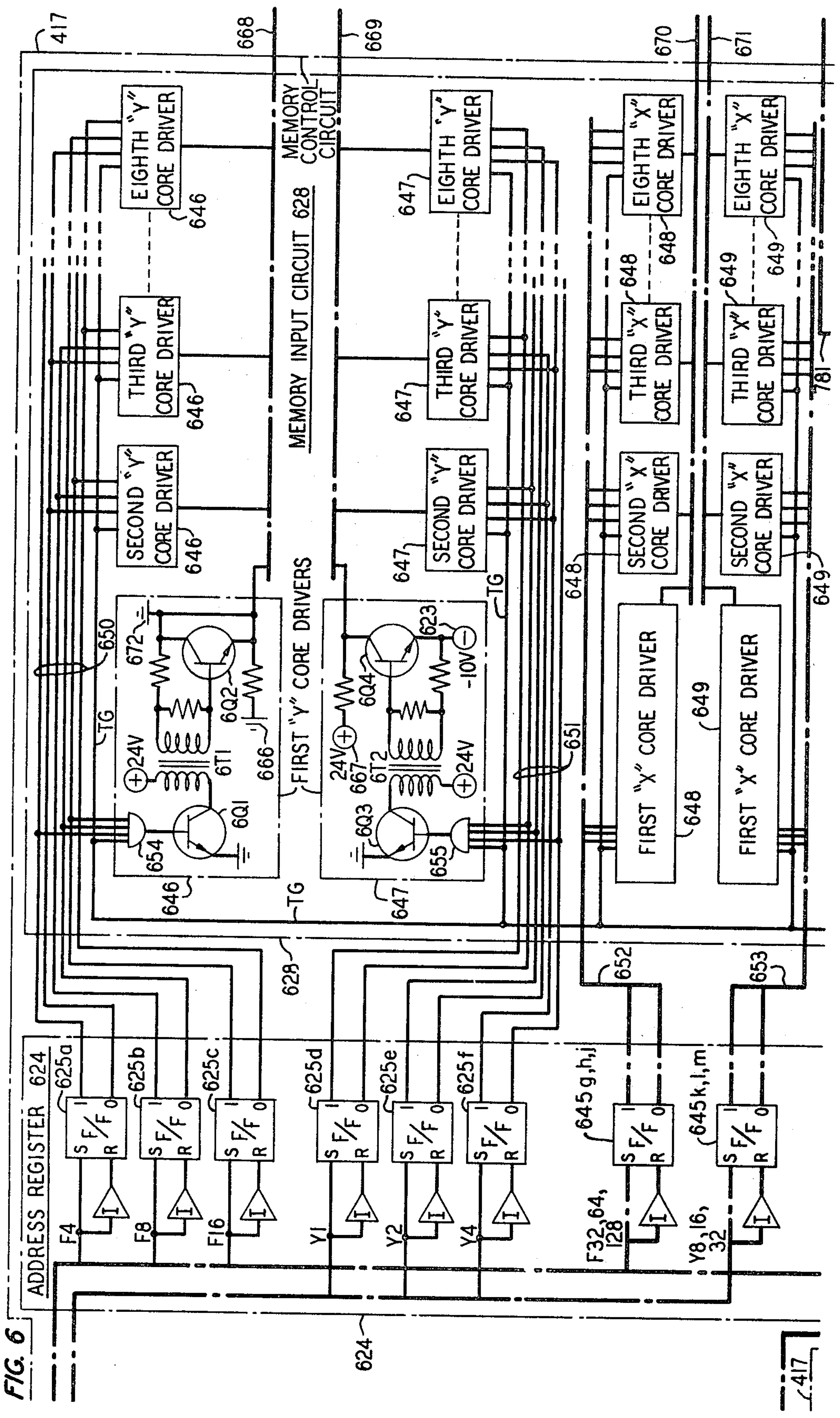

When three digits have been registered in register 316, relay 3D3 is operated and register 316 bids for connection to memory control 417. To do so, relay 4SSO in register connector 423 (FIG. 4) is operated over a path through lead B, make contact 3D3–1, and break contacts 347–2, 3OK–1, and 3RV–7. Assuming memory control 471 is idle, cut-through relay 4RC0 is operated through the make contact of transfer contacts 4SS0–2 while the break contact opens the operate path to other 4RC– relays; thus guaranteeing that none of them may operate while relay 4RC0 is operated. Make contact 4RC0–1 forwards the ground potential that operated relay 4RC0 to memory control 417 to operate relay 4ON therein as a request to have the digits registered in register 316 checked. Other make contacts on relay 4RC0 cut through the trunk identity code leads F–1,2,4,8,16,32,64, and 128 and digit leads A–0,1,2,4,7; B–0,1,2,4,7; and C–0,1,2,4,7 to memory control 417. Relay 4FC is operated by the closure of make contact 4ON–1 and trunk identity code leads F–1,2,4,8,16,32,64, and 128 are connected to address register 624 in FIG. 6 to be stored in flip-flops 645 a,b,c,g,h, and *j*, 882, and 883 by make contacts 4FC–1 through 4FC–8.

Memory Interrogation

Figure 7:
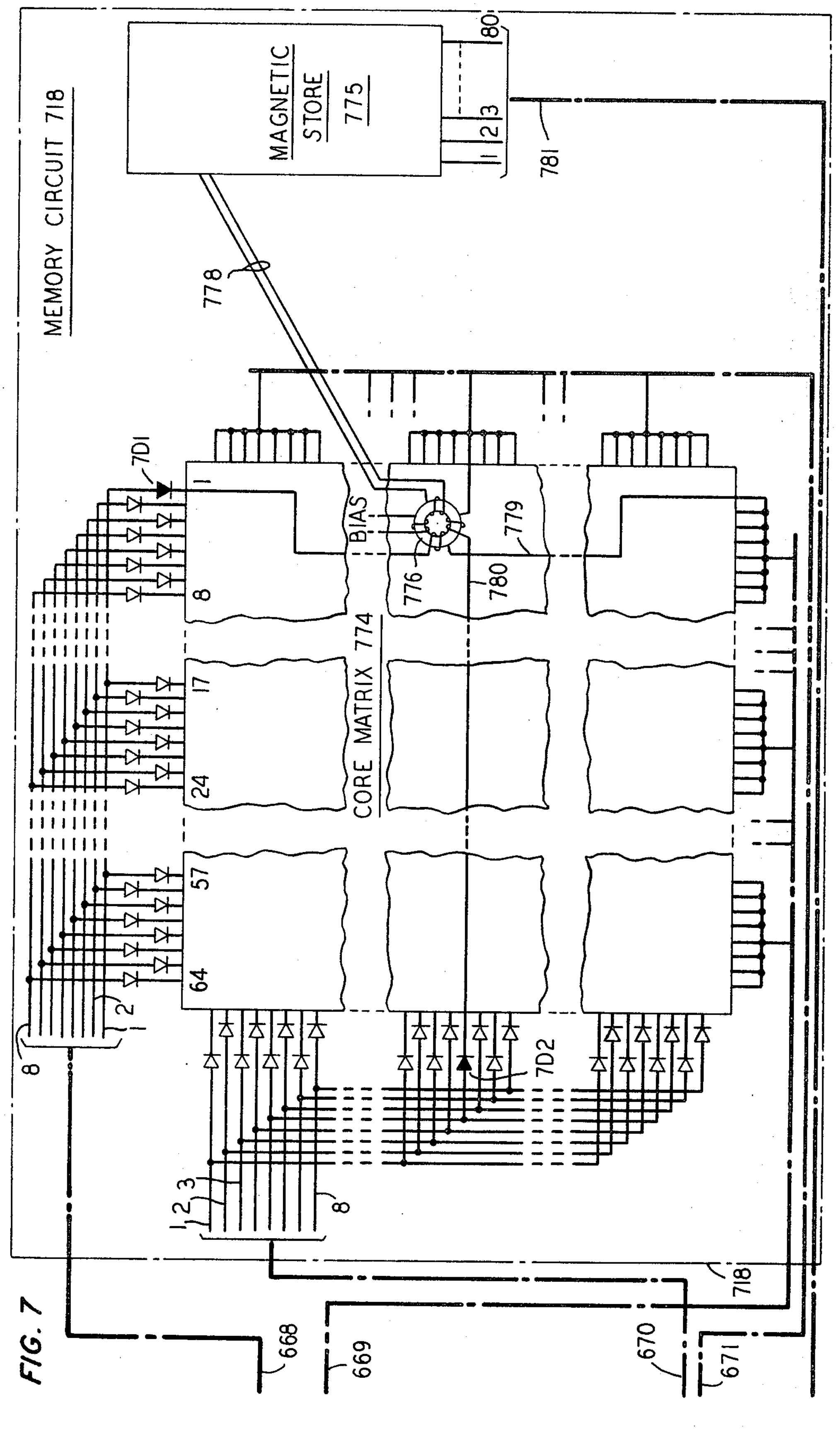
FIG. 7 is a schematic block diagram of a call diverter memory.

The three digits received from register 316 in standard 2/5 code are first checked by 2/5 code check circuits **425*a*–425*c* to make sure each digit has a valid 2/5 code before using them to interrogate magnetic store 775 in FIG. 7. If valid 2/5 codes are received for all three digits, relay 4STR is operated over a path (not shown) through check circuits 425*a*–425*c*. The three digits are then translated to decimal form by decimal translators 426*a*–426*c* to provide the inputs required by individual circuits in memory control 417** as described hereinafter.

Figure 5:
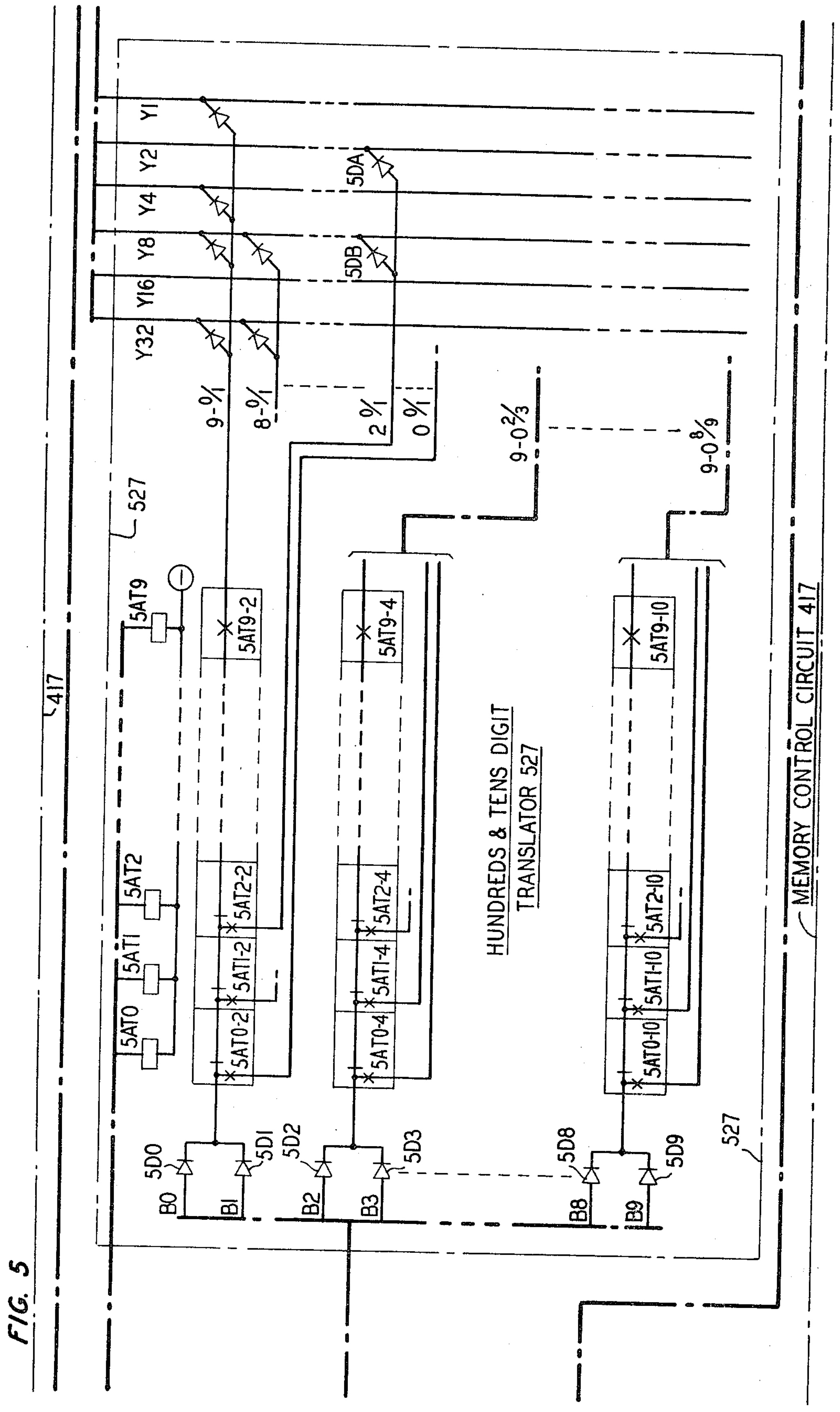

Assuming the calling party at telephone set 219 dialed area code "219," ground potential is present on output lead A2 of hundreds-digit decimal translator **426*a*; potential 443 is present on lead B1 of tens-digit decimal translator 426*b*; and potential 444 is connected through the winding of relay 4OK to lead C9 of units-digit decimal translator 426*c*. In preparation for interrogating memory circuit 718 of FIG. 7, the decimal outputs from hundreds-and-tens-digit decimal translators 426*a* and 426*b* are combined and translated by hundreds-and-tens-digit translator 527 of FIG. 5. To accomplish this, relay 5AT2 in translator 527 is operated by the ground potential on lead A2, and potential 443 on lead B1 is connected through diode 5D1, make contact 5AT2–2 and diodes 5DA and 5DB to binary output leads Y2 and Y8. The outputs from translator 527 are stored in flip-flops 645*d,e,f,k,l*, and m in address register 624 in FIG. 6 to be used as described further in the specification. The outputs from units-digit decimal translator 426*c* and the alternative outputs from tens-digit decimal translator 426*b*** to relay 4OT are also described further on in the specification.

The outputs from flip-flops **645*a* through 645*m* in register 624 are connected to distribution buses 650, 651, 652, and 653 from which inputs are derived for the Y core drivers 646*a*–646*h* and 647*a*–647*h* and the X core drivers 648*a*–648*h* and 649*a*–649*h* in memory input circuit 628. The output from each of these core drivers to cables 668, 669, 670, and 671 provide the drive inputs to memory 718 in FIG. 7** as described in detail further in the specification.

Before describing the operation of core drivers **646*a*–646*h*, 647*a*–647*h*, 648*a*–648*h*, and 649*a*–649*h* in detail, the manner in which words are read out of magnetic store 775 in memory 718** is described.

Magnetic store 775 contains 4,096 words of 88 bits apiece. 58-bit words are used in this embodiment of my invention to store 4,000 office and area codes. The 4,096 words are arranged in 64 planes, each containing 64 words. Each word in magnetic store 775 has an associated ferrite core in core matrix 774 which is pulsed to read out the word. The 4,096 cores in matrix 774 are arranged in a 64 by 64 matrix. 64 vertical and 64 horizontal leads weave through the matrix with each lead having turns on the 64 cores in its column or row. To pulse a particular core coincident current pulses must pass through the vertical and horizontal leads associated with the particular core. Core 776 in matrix 774 has its output winding 778 to magnetic store 775 pulsed by coincident current pulses on vertical lead 779 and horizontal lead 780. The outputs from core drives **646*a*–646*h*, 647*a*–647*h*, 648*a*–648*h*, and 649*a*–649*h* on cables 668, 669, 670, and 671 are respectively fanned out to provide the coincident current pulses necessary to pulse particular ones of the cores in matrix 774. The output of core driver 646*a* is fanned out through diodes and connected to inputs 1, 9, 17, 25, 33, 41, 49, and 57 of the 64 inputs on the top edge of matrix 774. The outputs of core driver 646*b* are fanned out through diodes and connected to inputs 2, 10, 18, 26, 34, 42, 50 and 58 on the top edge of matrix 774. Similarly the outputs from core drives 646*c*–646*h* are fanned out and connected to the other of the 64 inputs on the top edge of matrix 774. Outputs of core drivers 648*a*–648*h* are fanned out to the 64 inputs on the left edge of matrix 774 in the same manner. The outputs of core drivers 647*a*–647*h* and 649*a*–649*h* are fanned out to the bottom and right edges of matrix 774 in a different manner. Inputs 1 through 8 on the bottom and right edgs of matrix 774 are respectively connected to the fanned-out outputs of drivers 647***a* and 649*a*. Inputs 9 through 16 are respectively connected to drivers 647*b* and 649*b*. Similarly, groups of 8 inputs of the remaining inputs on the bottom and right edges of matrix 774 are connected to drivers 647*c*–647*h* and 649*c*–649*h*. When matrix 774 is pulsed, only 4 core drivers are energized; one in each of the 4 groups of drivers 646*a*–646*h*, 647*a*–647*h*, 648*a*–648*h*, and 649*a*–649*h*. With the fanout described, and with only one core driver connected to each edge of matrix 774 being energized, it is obvious that only one core in matrix 774 can have coincident current pulses on its associated horizontal and vertical leads.

Returning now to a detailed description of core drivers 646*a*–646*h*, 647*a*–647*h*, 648*a*–648*h*, and 649*a*–649*h*, only core drivers 646*a* and 647*a* are shown in detail but are representative of the other core drivers. All the core drivers have three inputs connected to their respective distribution buses 650, 651, 652, and 653. All the core drivers also have fourth input connected to trigger lead TG which is connected to the output of strobing monopulser 887. Drivers 646*a*–646*h*, 647*a*–647*h*, 648*a*–648*h*, and 649*a*–649*h* each have an input AND gate to which all input leads are connected. To energize a driver all four inputs to the driver must be high and a maximum of four drivers, one connected to the inputs of each edge of core matrix 774, will be energized at any one time. When all four inputs to drivers 646*a* and 467*a* are not high AND gates 654 and 655 give no output and transistors 6Q1 and 6Q3 are not conducting. Transistors 6Q2 and 6Q4 also are not conducting as their emitter and base terminals are at the same potential. With transistors 6Q2 and 6Q4 not conducting, ground potential 666 is applied through cable 668 to the anode terminal of diode 7D1 and seven other diodes and positive potential 667 is applied through cable 669 and vertical lead 779 in matrix 774 to the cathode terminal of diode 7D1 and seven other diodes. Diode 7D1 is thereby back-biased and no current flows through vertical lead 779. In similar fashion no current flows through horizontal lead 780 in matrix 774.

To show how core 776 is pulsed, let us return now to the example wherein the code "219" has been dialed at telephone set 219 and assume that trunk identity code cross-connections are made between terminal 237 and terminals 238*a*, *b*, *c*, and *e* in incoming trunk 214. The ground potential on terminals 238*a*, *b*, *c*, and *e* is carried on leads F1, F2, F4, and F16 to address register 624 where flip-flops 645*a*, 645*c*, 882, and 883 are placed in their set state. As a result the one output of flip-flops 645*a*, 645*c*, 882 and 883 is high. The absence of ground input to flip-flops 645*b*, *g*, *h*, and *j* causes them to be in their reset state with their zero outputs high. As previously described, the code "219" gave an output on leads Y2 and Y8 and flip-flops 645*e* and 645*k* are driven to their set state with their one outputs high, while the zero outputs are high for flip-flops 645*d*, *f*, *g*, *h*, *j*, *l*, and *m*. With these outputs out of flip-flops 645*a*–*m* only drivers 646*a*, 647*a*, 648*e*, and 649*e* have their three bus-connected inputs high, and only these drivers provide an output pulse to matrix 774 when a strobe pulse is applied to the fourth input of these drivers.

Figure 8:
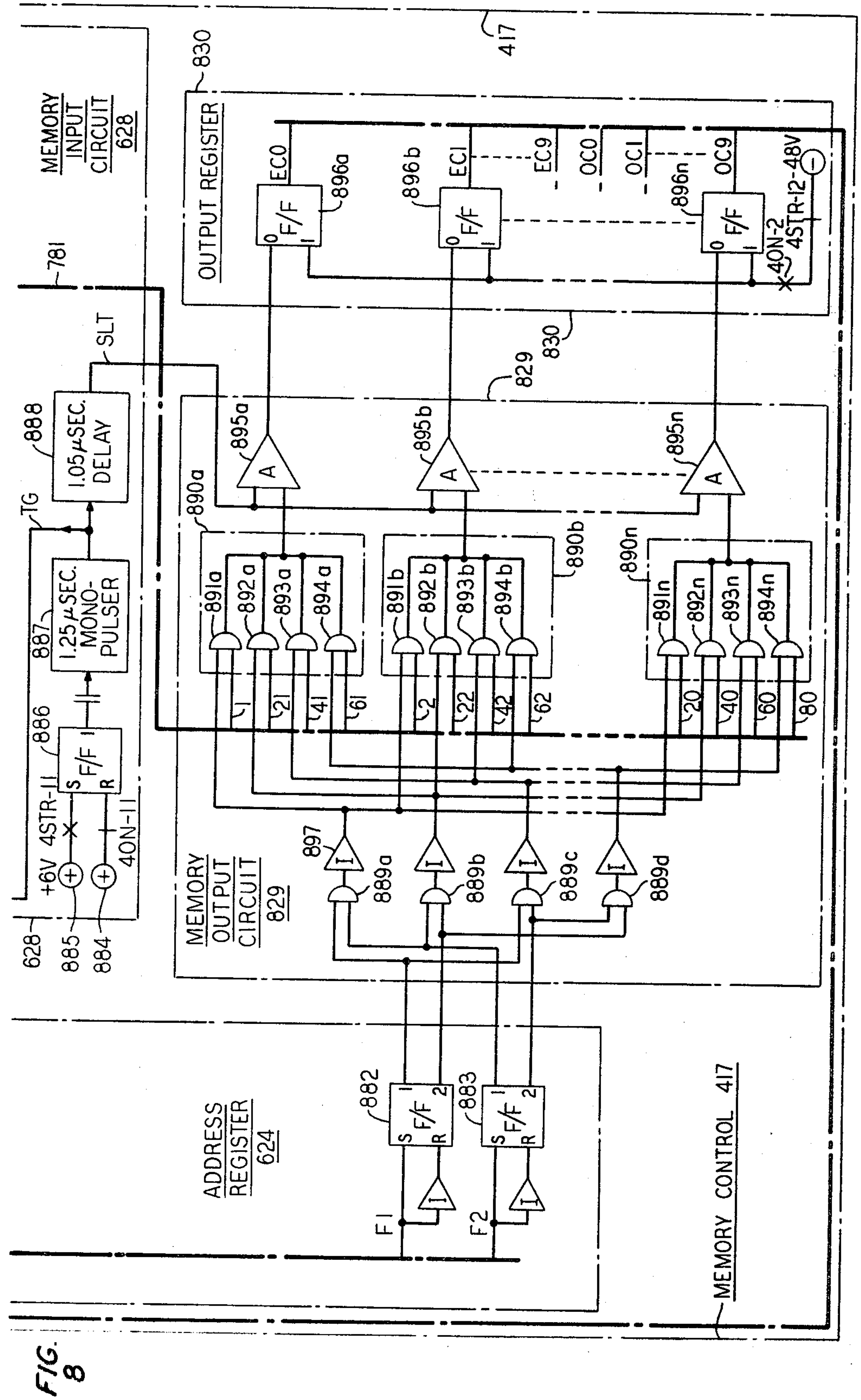

Two strobe pulses are generated for the proper functioning of memory input circuit 628 and memory output circuit 829 upon the seizure of memory control 417 by register 316. Relay 4ON is unoperated prior to seizure of memory control 417 and flip-flop 886 in memory input 628 is in its reset state due to potential 884 being applied through break contact 4ON–11 to the reset terminal. Upon seizure of memory control 417 relay 4ON is operated and potential 884 is removed from the rest input of flip-flop 886 by break contact 4ON-11. Shortly after the opertion of relay 4ON, relay 4STR is operated and potential 885 is applied to the set terminal of flip-flop 886 by make contact 4STR–11, changing flip-flop 886 to its set state. The one output of flip-flop 886 goes high and monopulser 887 generates a 1.25 microsecond pulse on lead TG. This pulse is also applied to delay circuit 888 to provide the 1.25 microsecond pulse 1.05 microseconds later to be used in memory output circuit 829 as described further in the specification. When monopulser 887 applies the pulse to lead TG all four inputs are high on core drivers 646*a*, 647*a*, 648*e*, and 649*e*. The outputs of AND gates 654 and 655 in drivers 646*a* and 647*a* go high for the period of the pulse on lead TG, causing transistors 6Q1 and 6Q3 to conduct for the pulse period. The pulse is thereby coupled across transformers 6T1 and 6T2 to forward-bias transistors 6Q2 and 6Q4 for the period of the pulse. Transistors 6Q2 and 6Q4 conduct, shunting down potentials 666 and 667, to apply ground potential 672 through cable 668 to the anode of diode 7D1 and negative potential 673 through cable 669, and vertical lead 779 in matrix 774 to the cathode terminal of didoe 7D1. Diode 7D1 is forward-biased for the period of the pulse and a pulse is applied to vertical lead 779 which has a winding on core 776. In similar manner drivers 648*e* and 649*e* concurrently apply a pulse to horizontal lead 780 which also has a winding on core 776. The coincidence of these two pulses through core 776 induces a pulse on output lead 778. The pulse on lead 778 causes 88 bits in magnetic store 775 to be read out nondestructively and the 80 bits of interest are sent over cable 781 to memory output circuit 829 in FIG. 8. The first 20 leads in cable 781 are respectively connected to AND gates 891*a*–891*n* ($n$=20) in AND gate packs 890*a*–890*n* ($n$=20). The second 20 leads are respectively connected to AND gates 892*a*–892*n* ($n$=20) and so forth. The output leads of the four AND gates in each of packs 890*a*–890*n* ($n$=20) are tied together and respectively connected to one of the two inputs of sense amplifiers 895*a*–895*n* ($n$=20).

Of the 80 bits read out of magnetic store 775 only one bit indicates whether the three-digit code "219" is allowed. A multistep process of elimination is used to find the bit corresponding to code "219." The first step of elimination utilizes the portion of the trunk identity code on leads F1 and F2 to select 20 of the 80 leads in cable 781. The binary code on leads F1 and F2 to flip-flops 882 and 883 in address register 624 can represent four different states which are detected by the four AND gates 889*a*–889*d* in memory output circuit 829. The output of each of AND gates 889*a*–889*d* is fanned out to provide one of the two inputs to one of the AND gates in each of packs 890*a* through 890*n* ($n$=20). Since only one of AND gates 889*a*–889*d* can have a high output only one AND gate in each of packs 890*a*–890*n* can have both inputs high. Therefore there is only one signal to each of sense amplifiers

895a–895n (n=20). In the present example, ground potential is present on both leads F1 and F2 causing flip-flops 882 and 883 to be in their set states with their one outputs high. As a result only AND gate 889a has both inputs high. The high output of AND gate 889a is amplified by amplifer 897 and fanned to provide one of the two inputs to gates 891a–891n (n=20). As gates 891a–891n have their second inputs connected to leads 1–20 of cable 781, only the 20 bits of information on leads 1–20 are gated to sense amplifiers 895a–895n (n=20). 1.05 microseconds after monopulser 887 generates the trigger pulse on lead TG to read memory 718, delay circuit 888 applies the delayed pulse to lead SLT which is fanned out to the second inputs of sense amplifiers 895a–895n. Sense amplifiers 895a–895n shape the output bits and pass them to be stored in flip-flops 896a–896n (n=20) of output register 830.

Of the 20 bits of information now stored in output register 830, the proper odd or even group of 10 is to be selected. The outputs of the first ten of flip-flops 896a–896n are connected by way of leads OC0 to OC9 to the break contacts of transfer contacts 40T–1 through 40T–10 in FIG. 4 and the outputs of the second ten of flip-flops 896a–896n are connected by way of leads EC0 to EC9 to the make contacts. The previously mentioned odd-tens relay 4OT in FIG. 4 is connected to the odd-numbered outputs of tens-digit decimal translator 426b and is operated only if the tens digit of the 3-digit code being checked is odd. In the present example (code "219") potential 443 is present on lead B1, completing an operate path for relay 4OT through diode 4D1. With relay 4OT operated, the 10 bits of information on leads OC0 to OC9 from output register 830 are connected to units-digit decimal translator 426c through make contacts 40T–1 to 40T–10. As the unit digit dialed is nine, negative potential 444 is connected through the winding of relay 40K to output lead C9. If the code "219" is an allowed code, ground potential is present on lead OC9 and relay 40K is operated. If the code "219" had not been an allowed code, ground potential would not have been present on lead OC9 and relay 40K would not be operated.

ALLOWED INDICATION RETURNED TO DIVERTER TRUNK CIRCUIT

Upon seizure of memory control 417, relay 4STR is operated and an operate path is completed to realy 4RD at make contact 4STR–8. However, relay 4RD is slow operating and does not operate till after the code check has been performed. Make contact 4RD–1 prevents a false code check determination by preventing ground potential from being applied through transfer contacts 40K–5 to leads RV or OK till this time.

With relay 40K operated, indicating an allowed call, relay 30K in register 316 is operated via make contacts 4RC0–3, 40K—5 and 4RD—1 to register the allowed state of the call. Relay 30K locks itself operated through make contacts 30K—5 and 30N—1. Memory control 417 is now released because ground potential is removed from lead B by break contact 30K–1, thereby releasing relays 4SS—0 and 4RC—0 in connector 423. Relay 40N in memory control 417 is thereby released by the opening of make contact 4RC0–1. In turn relays 4FC and 4STR are released, and memory control 417 is idle and ready to check another code.

The allowed status of a code is now returned to diverter trunk circuit 214 from register 316 over lead OK. The ground potential that operated relay 30K is also present on lead OK and passes through link 321 to operate relay 20K in diverter trunk circuit 214. Ground potential is removed from lead ST at break contact 20K—1 causing link 321 and register 316 to be released. At this time relays 2ST, 2SLV, 2STD, and 2CT remain operated in diverter turnk circuit 214 and they remain operated till the call is terminated. cNOT ALLOWED INDICATION RETURNED TO DIVERTER TRUNK CIRCUIT With relay 40K not operated, indicating a not allowed call, ground potential is returned to register 316 from memory control 417 to operate relay 3RV via lead RV make contact 4RC0–2, the break contact of transfer contacts 40K—5, and make contact 4RD—1. Relay 3RV registers the not allowed state of the call. Relay 3RV locks operated through make contacts 3RV—8 and 30N—4, and ground is removed from lead B at break contact 3RV—7 to release memory control 417 for further use as previously described.

Relay 2RV in diverter trunk circuit 214 is now operated as an indication that the call is not allowed via lead D, link 321, and make contact 3RV—9. Relay 2RV locks itself operated through make contacts 2RV—1 and 2CT—11. Relay 3A in link 321 is released, releasing both link 321 and register 316, by break contact 2RV—8 removing ground potential from lead ST. The connection of trunk 212 to line link 215 is opened at the break contacts of transfer contacts 2RV–4 and 2RV–5 while the make contacts reconnect trunk 212 to recorded announcement trunk 236. The loop on trunk 212 causes announcement trunk 236 to go through its cycle of instructing the caller to hand up and recall the PBX operator to complete the call. Line link 215 interprets the opening of the line at break contacts 2RV—4 and 2RV—5 as an on-hook condition and removes ground potential from lead S to release relay 2SLV. Relay 2SLV in turn opens the holding path to relays 2STD and 2CT at make contact 2SLV—1. Relay 2STD releases but relay 2CT remains operated due to a ground potential on lead S1 from announcement trunk 236. When station 219 goes on-hook, announcement trunk 236 removes ground potential from lead S1 and relay 2CT is then released. Finally, relay 2RV is released by the opening of make contact 2CT—11 and trunk circuit 214 is idle and ready to handle another outgong call over trunk 212.

INCOMING CALL TO PBX

When a call is directed to telephone set 219 from a telephone set (not shown) external to PBX 211, the call diverter is not seized by diverter trunk circuit 214. Line link 215 operates realy 2SLV by applying ground potential to sleeve lead S. In turn relay 2CT is operated through diode 2D1 and make contact 2SLV—1. The make contacts of transfer contacts 2CT—9 and 2CT—10 complete a path including the break contacts of transfer contacts 2RV—4 and 2RV—5 to connect trunk 212 to link 215. While trunk circuit 214 remains busy, only relays 2SLV and 2CT are operated and they are released when the call is terminated.

What is claimed is:

1. A call diverter arrangement for use in an automatic telephone system which includes a central office containing a switching network, a plurality of private branch exchanges associated with said office, at least one trunk line extending between each of said exchanges and said office, each trunk line terminated in said office by an individual one of a plurality of trunk circuits for extending said trunk lines to said network when outgoing calls are being placed thereon, and each of said trunk circuits providing an identification of its associated exchange, said diverter arrangement comprising a plurality of registers common to said exchanges, one of said registers being connected to ones of said trunk circuits for registering digit codes having a predetermined number of digits for out-going calls over any of said circuits, first means common to said plurality of registers and seized by a first one of said registers in which said predetermined number of digits have been registered for checking said digits in said first register to determine whether they represent a restricted call, said first checking means including a memory having a plurality of of segmented portions, one of said portions being assigned to each of said exchanges and having individual allowed call digit codes stored therein as specific memory bits, said specific memory bits being in a first of two states, a memory control jointly responsive to a first and a second digit of one of said codes registered in said first register and to an identification of a first one of said exchanges from which said registered code originated for reading out a first group of said memory bits stored in a first one of said memory portions assigned to said first exchange, said first group of memory bits including one bit corresponding to said code registered in said first register, means jointly responsive to said second digit and to a third digit of said code registered in said first register for determining the state of said one bit, said determining means also generating said first signal upon said one bit being in other than said first state, and means responsive to said first signal for disconnecting the extended trunk line of said first exchange from said network.

2. The invention in accordance with claim 1 further comprising second means associated with each of said registers for checking digits as they are registered in their associated registers before said predetermined number of digits have been registered in any one of said registers to determine whether a call over extended ones of said trunk lines should be restricted, each of said first checking means generating a first signal causing termination of a call over an extended one of said lines upon making a restricted call determination.

3. The invention in accordance with claim 1 wherein said determining means comprises, a memory output circuit responsive to said first exchange identification for selecting a second group of bits including said one bit from said first group of bits before the state of said one bit is determined.

4. The invention in accordance with claim 3 wherein said determining means further comprises means responsive to said second digit for selecting a third group of bits including said one bit from said second group of bits before the state of said one bit is determined.

5. The invention in accordance with claim 4 wherein said determining means further comprises, digit check means comparing said third digit registered in said first register with said third group of bits to determine the state of said one bit, said digit check means generating said first signal upon said one bit being in other than said first state.

6. The invention in accordance with claim 5 wherein said digit check means comprises means for generating a second signal upon said one bit being in said first state, said second signal causing said first register to be disconnectd from said trunk circuit associated with said first exchange.

7. The invention in accordance with claim 6 wherein each of said registers comprises means individually responsive to said first or said second signal for disconnecting said registers from ones of said trunk circuits.

8. The invention in accordance with claim 7 wherein said memory control comprises translator means responsive to said first and said second digits in said first register for providing a binary coded output signal, and means jointly responsive to said binary coded output signal and to said first exchange identification for reading out said first group of memory bits stored in said memory portion assigned to said first exchange.

9. A call diverter arrangement for use in an automatic telephone system which includes a central office containing a switching network, a plurality of private branch exchanges associated with said office, at least one trunk line extending between each of said exchanges and said office, each trunk line terminated in said office by an individual one of a plurality of trunk circuits for extending said trunk lines to said network when outgoing calls are being placed thereon, and each of said trunk circuits providing an identification of its associated exchange, said diverter arrangement comprising a plurality of registers common to said exchanges, ones of said regiseters being connected to ones of said trunk circuits for registering digit codes up to a predetermined number of digits for outgoing calls over any of said trunk circuits, said registers being fewer in number than said exchanges, link means responsive to a first one of said trunk circuits extending an outgoing call to said network for connecting an idle one of said registers to said first trunk circuit to register dialed digits for the outgoing call thereover, first relay means connected to each of said registers and immediately responsive to the registration of the first digit therein to check said first digit and generate a first signal indicating the call over said first trunk circuit should be restricted for selected first digits, means in said first trunk circuit responsive to said first signal for opening the associated extended trunk line connection to said network, means common to said registers and connected to ones of said registers that have registered said predetermined number of digits for checking the digits in the last-mentioned registers to determine whether they represent a restricted call, said checking means including a memory having a plurality of segmented portions, ones of said portions being assigned to each of said exchanges and having individual allowed call digit codes stored therein as specific memory bits, said specific memory bits being in a first of two binary states, a translator responsive to a first and a second digit registered in a first one of said registers connected to said checking means for generating a binary addressing code used to read out memory bits stored in a first one of said memory portions assigned to said first exchange, a memory input circuit jointly responsive to said binary addressing code and to a first part of said exchange identification provided by the one of said trunk circuits connected to said first register for reading out a first group of said memory bits from said first memory portion, said first group of bits including one bit corresponding to said digit code stored in said first register, memory output means responsive to a second part of said first exchange identification for selecting a second group of memory bits including said one bit from said first group of memory bits, second relay means being selectively operated or nonoperated in response to the value of said second digit stored in said first register for selecting a third group of memory bits including said one bit from said second group of bits, third relay means being selectively operated or nonoperated in response to the value of a third digit stored in said first register for selecting said one bit from said third group of memory bits, fourth relay means responsive to said one bit being in said first state for generating a second signal indicating the call over said first trunk circuit is allowed, said fourth relay means being responsive to said one bit being in other than said first state for also generating said first signal indicating the call over said first trunk circuit is to be restricted, fifth relay means in said first trunk circuit being directly responsive to said second signal for causing said link means to disconnect said first trunk circuit from said first register, sixth relay means in said first register for receiving said first signal generated by said fourth relay means, contacts of said sixth relay means forwarding said last-mentioned first signal through said link means to said first trunk circuit, and seventh relay means in said first trunk circuit being responsive to said first signal generated by said first relay means or by said sixth relay means for disconnecting the extended trunk line of said first exchange from said network.

* * * * *